US008200948B2

(12) United States Patent
Kershaw et al.

(10) Patent No.: US 8,200,948 B2
(45) Date of Patent: Jun. 12, 2012

(54) APPARATUS AND METHOD FOR PERFORMING RE-ARRANGEMENT OPERATIONS ON DATA

(75) Inventors: Daniel Kershaw, Cambridge (GB); Dominic Hugo Symes, Cambridge (GB); Alastair Reid, Cambridge (GB)

(73) Assignee: ARM Limited, Cambridge (GB)

( * ) Notice: Subject to any disclaimer, the term of this patent is extended or adjusted under 35 U.S.C. 154(b) by 973 days.

(21) Appl. No.: 11/987,720

(22) Filed: Dec. 4, 2007

(65) Prior Publication Data

US 2008/0141004 A1    Jun. 12, 2008

(30) Foreign Application Priority Data

Dec. 12, 2006  (GB) .................................. 0624774.6

(51) Int. Cl.
*G06F 7/38* (2006.01)
*G06F 9/30* (2006.01)
*G06F 9/302* (2006.01)
*G06F 15/80* (2006.01)

(52) U.S. Cl. ............ 712/221; 712/16; 712/22; 712/220; 712/222

(58) Field of Classification Search ..................... 712/16, 712/22, 220, 221, 222
See application file for complete search history.

(56) References Cited

U.S. PATENT DOCUMENTS

| | | | | |
|---|---|---|---|---|
| 4,601,006 A | * | 7/1986 | Liu | 708/401 |
| 5,757,432 A | * | 5/1998 | Dulong et al. | 348/384.1 |
| 5,815,421 A | * | 9/1998 | Dulong et al. | 708/520 |
| 5,822,619 A | * | 10/1998 | Sidwell | 712/300 |
| 6,145,077 A | * | 11/2000 | Sidwell et al. | 712/300 |
| 6,175,892 B1 | * | 1/2001 | Sazzad et al. | 711/100 |
| 6,266,758 B1 | | 7/2001 | van Hook et al. | |
| 6,922,716 B2 | * | 7/2005 | Desai et al. | 708/524 |
| 2003/0014457 A1 | * | 1/2003 | Desai et al. | 708/520 |
| 2004/0054879 A1 | | 3/2004 | Macy, Jr. et al. | |
| 2004/0133617 A1 | | 7/2004 | Chen et al. | |

(Continued)

FOREIGN PATENT DOCUMENTS

EP        1363198 A2 * 11/2003

(Continued)

OTHER PUBLICATIONS

United Kingdom Search Report dated Apr. 20, 2007.

(Continued)

*Primary Examiner* — Aimee Li
(74) *Attorney, Agent, or Firm* — Nixon & Vanderhye P.C.

(57) ABSTRACT

An apparatus and method are provided for performing re-arrangement operations on data. The data processing apparatus has a register data store with a plurality of registers for storing data, and processing logic for performing a sequence of operations on data including at least one re-arrangement operation. The processing logic has scalar processing logic for performing scalar operations and SIMD processing logic for performing SIMD operations. The SIMD processing logic is responsive to a re-arrangement instruction specifying a family of re-arrangement operations to perform a selected re-arrangement operation from that family on a plurality of data elements constituted by data in one or more registers identified by the re-arrangement instruction. The selected re-arrangement operation is dependent on at least one parameter provided by the scalar processing logic, that parameter identifying a data element width for the data elements on which the selected re-arrangement operation is performed. By such an approach, significant code density improvements can be made in respect of the code executed by the SIMD processing logic.

22 Claims, 12 Drawing Sheets

U.S. PATENT DOCUMENTS

| | | | |
|---|---|---|---|
| 2004/0142717 A1* | 7/2004 | Schmidt et al. | 455/550.1 |
| 2005/0125476 A1* | 6/2005 | Symes et al. | 708/524 |
| 2005/0125631 A1* | 6/2005 | Symes et al. | 712/22 |
| 2005/0125635 A1* | 6/2005 | Symes et al. | 712/221 |
| 2005/0125636 A1* | 6/2005 | Ford et al. | 712/221 |
| 2005/0125640 A1* | 6/2005 | Ford et al. | 712/225 |
| 2005/0125647 A1* | 6/2005 | Symes et al. | 712/300 |
| 2006/0095712 A1 | 5/2006 | Selvaggi et al. | |

FOREIGN PATENT DOCUMENTS

| | | |
|---|---|---|
| EP | 1 873 627 | 1/2008 |
| GB | 2 409 064 | 6/2005 |
| GB | 2 409 065 | 6/2005 |

OTHER PUBLICATIONS

Sonmez, Nehir et al., "SIxD: A Configurable Application-Specific SISD/SIMD Microprocessor Soft-Core", IEEE, 4 pages (2006).

Yang, Xiao et al., "Fast Subword Permutation Instructions Based on Butterfly Networks", Proceedings of SPIE, Media Processor 2000, pp. 80-86, (Jan. 27-28, 2000).

Lin, Yuan et al., "Soda: A Low-Power Architecture for Software Radio", 12 pages.

* cited by examiner

| ZIP INSTN | INPUT VALUES | RESULT IF SCALAR=0 (D.E.W.=1) | RESULT IF SCALAR=1 (D.E.W.=2) | RESULT IF SCALAR=2 (D.E.W.=4) | RESULT IF SCALAR≥3 (D.E.W.≥8) |
|---|---|---|---|---|---|
| REG 1 | F0 E0 D0 C0 B0 A0 90 80 | F0 70 E0 60 D0 50 C0 40 | F0 E0 70 60 D0 C0 50 40 | F0 E0 D0 C0 70 60 50 40 | F0 E0 D0 C0 B0 A0 90 80 |
| REG 0 | 70 60 50 40 30 20 10 00 | B0 30 A0 20 90 10 80 00 | B0 A0 30 20 90 80 10 00 | B0 A0 90 80 30 20 10 00 | 70 60 50 40 30 20 10 00 |

Fig. 3

| UNZIP INSTN | INPUT VALUES | RESULT IF SCALAR=0 (D.E.W.=1) | RESULT IF SCALAR=1 (D.E.W.=2) | RESULT IF SCALAR=2 (D.E.W.=4) | RESULT IF SCALAR≥3 (D.E.W.>8) |
|---|---|---|---|---|---|
| REG 1 | F | F | F | F | F |
| | E | D | E | E | E |
| | D | B | B | D | D |
| | C | 9 | A | C | C |
| | B | 7 | 7 | 7 | B |
| | A | 5 | 6 | 6 | A |
| | 9 | 3 | 3 | 5 | 9 |
| | 8 | 1 | 2 | 4 | 8 |
| REG 0 | 7 | E | D | B | 7 |
| | 6 | C | C | A | 6 |
| | 5 | A | 9 | 9 | 5 |
| | 4 | 8 | 8 | 8 | 4 |
| | 3 | 6 | 5 | 3 | 3 |
| | 2 | 4 | 4 | 2 | 2 |
| | 1 | 2 | 1 | 1 | 1 |
| | 0 | 0 | 0 | 0 | 0 |

Fig. 4

| TRANSPOSE INSTN | INPUT VALUES | RESULT IF SCALAR=0 (D.E.W.=1) | RESULT IF SCALAR=1 (D.E.W.=2) | RESULT IF SCALAR=2 (D.E.W.=4) | RESULT IF SCALAR≥3 (D.E.W.≥8) |
|---|---|---|---|---|---|
| REG 1 | F0 | F0 | F0 | F0 | F0 or 7 |
|  | E0 | 70 | E0 | E0 | E0 or 6 |
|  | D0 | D0 | 70 | D0 | D0 or 5 |
|  | C0 | 50 | 60 | C0 | C0 or 4 |
|  | B0 | B0 | B0 | 70 | B0 or 3 |
|  | A0 | 30 | A0 | 60 | A0 or 2 |
|  | 90 | 90 | 30 | 50 | 90 or 1 |
|  | 80 | 10 | 20 | 40 | 80 or 0 |
|  |  |  |  |  | OR |
| REG 0 | 70 | E0 | D0 | B0 | F or 70 |
|  | 60 | 60 | C0 | A0 | E or 60 |
|  | 50 | C0 | 50 | 90 | D or 50 |
|  | 40 | 40 | 90 | 80 | C or 40 |
|  | 30 | A0 | 80 | 30 | B or 30 |
|  | 20 | 20 | 10 | 20 | A or 20 |
|  | 10 | 80 | 00 | 10 | 9 or 10 |
|  | 00 | 00 | 00 | 00 | 8 or 00 |

Fig. 5

| DUPLICATE INSTN INPUT VALUES | RESULT IF SCALAR=0 (D.E.W.=1) | RESULT IF SCALAR=1 (D.E.W.=2) | RESULT IF SCALAR=2 (D.E.W.=4) | RESULT IF SCALAR≥3 (D.E.W.≥8) |
|---|---|---|---|---|
| 7 | 0 | 1 | 3 | 7 |
| 6 | 0 | 0 | 2 | 6 |
| 5 | 0 | 1 | 1 | 5 |
| 4 | 0 | 0 | 0 | 4 |
| 3 | 0 | 1 | 3 | 3 |
| 2 | 0 | 0 | 2 | 2 |
| 1 | 0 | 1 | 1 | 1 |
| 0 | 0 | 0 | 0 | 0 |

REG 0

Fig. 6

| DUPLICATE INSTN | INPUT VALUES | RESULT VALUE DEW=1 LANE=8 | RESULT VALUE DEW=2 LANE=8 | RESULT VALUE DEW=4 LANE=8 | RESULT VALUE DEW≥8 LANE=8 | RESULT VALUE DEW=1 LANE=4 | RESULT VALUE DEW=2 LANE=4 | RESULT VALUE DEW≥4 LANE=4 | RESULT VALUE DEW=1 LANE=2 | RESULT VALUE DEW≥2 LANE=2 | RESULT VALUE DEW≥1 LANE=1 |
|---|---|---|---|---|---|---|---|---|---|---|---|
| REG 0 | 7 | 0 | 1 | 3 | 7 | 4 | 5 | 7 | 6 | 7 | 7 |
|  | 6 | 0 | 0 | 2 | 6 | 4 | 4 | 6 | 6 | 6 | 6 |
|  | 5 | 0 | 1 | 1 | 5 | 4 | 5 | 5 | 4 | 5 | 5 |
|  | 4 | 0 | 0 | 0 | 4 | 4 | 4 | 4 | 4 | 4 | 4 |
|  | 3 | 0 | 1 | 3 | 3 | 0 | 1 | 3 | 2 | 3 | 3 |
|  | 2 | 0 | 0 | 2 | 2 | 0 | 0 | 2 | 2 | 2 | 2 |
|  | 1 | 0 | 1 | 1 | 1 | 0 | 1 | 1 | 0 | 1 | 1 |
|  | 0 | 0 | 0 | 0 | 0 | 0 | 0 | 0 | 0 | 0 | 0 |

Fig. 7

| REVERSE INST'N | INPUT VALUES | RESULT IF SCALAR=0 (D.E.W.=1) | RESULT IF SCALAR=1 (D.E.W.=2) | RESULT IF SCALAR=2 (D.E.W.=4) | RESULT IF SCALAR≥3 (D.E.W.≥8) |
|---|---|---|---|---|---|
| REG 0 { | 7 0 | 0 0 | 1 0 | 3 0 | 7 0 |
| | 6 0 | 1 0 | 0 0 | 2 0 | 6 0 |
| | 5 0 | 2 0 | 3 0 | 1 0 | 5 0 |
| | 4 0 | 3 0 | 2 0 | 0 0 | 4 0 |
| | 3 0 | 4 0 | 5 0 | 7 0 | 3 0 |
| | 2 0 | 5 0 | 4 0 | 6 0 | 2 0 |
| | 1 0 | 6 0 | 7 0 | 5 0 | 1 0 |
| | 0 0 | 7 0 | 6 0 | 4 0 | 0 0 |

Fig. 8

APPARATUS AND METHOD FOR PERFORMING RE-ARRANGEMENT OPERATIONS ON DATA

BACKGROUND OF THE INVENTION

1. Field of the Invention

The present invention relates to an apparatus and method for performing re-arrangement operations on data.

2. Description of the Prior Art

When it is necessary to perform a particular data processing operation on a number of separate data elements, one known approach for accelerating the performance of such an operation is to employ a SIMD (Single Instruction Multiple Data) approach. In accordance with the SIMD approach, multiple of the data elements are placed side-by-side within a register and then the operation is performed in parallel on those data elements.

Whilst the above approach works well for certain types of data processing operations, and allows a significant performance improvement to be realised, there are certain data processing operations where it is impractical to arrange the required data elements in such a way that the above SIMD approach can be used. For example, if a data processing operation required four input data elements, then the prior art SIMD approach would involve placing one set of values for those four input data elements within corresponding locations of four source registers, and to then pack into the other locations of those source registers further sets of values for those four input data elements, so that the data processing operation can be performed in parallel on those packed data elements. However, in some situations it may not be possible to perform the required data processing operation with the data packed in that manner, or alternatively it may take such a significant re-ordering of the data that the potential benefit of employing the SIMD approach would be negated by the extra time taken to re-arrange the data in the required manner.

To assist in re-ordering data such that it is amenable to being processed by SIMD based arithmetic, various permutation networks have been developed. For example, the Article "Fast Subword Permutation Instructions Based on Butterfly Networks" by Xiao Yang et al, Proceedings of SPIE, Media Processor 2000, Jan. 27-28, 2000, San Jose, Calif., Pages 80 to 86, describes the use of a butterfly network to provide a generalised technique for performing arbitrary subword permutations. Subword permutation instructions are proposed, and it is indicated that the maximum number of instructions used in accordance with the described technique for permuting n subwords is log n, or 2 log n if the loads for the configuration registers are taken into account.

The Article "SODA: A Low-power Architecture For Software Radio" by Yuan Lin et al, University of Michigan, ISCA Jun. 2006, describes a programmable architecture for high-end signal processing for software defined radio. This architecture makes use of a SIMD pipeline, and discloses the use of a SIMD shuffle network to support intra-processor data movements. The SIMD shuffle network is an iterative partially connected network consisting of a shuffle exchange network, an inverse shuffle exchange network and a feedback path. It is indicated that by using such a network any permutation of size N can be done with $2 \log_2 N - 1$ iterations of either the shuffle exchange or inverse shuffle exchange network, where N is the SIMD width.

Whilst the above-described permutation networks enable a wide variety of different re-ordering to be achieved, a significant number of instructions are required to perform any particular re-ordering, and accordingly this had an adverse effect on the size of the SIMD code.

GB-A-2,409,064 describes the provision of various permutation instructions, for example an interleave instruction, where the instruction itself can identify a lane size and a data element size, with the lane size being a multiple of the data element size. When such an instruction is decoded, control signals are sent to the processing logic to define based on the lane size a number of lanes of parallel processing in at least one of the registers, and then to perform in parallel a data processing operation on the data elements within each of those lanes. By such an approach, the same basic instruction can be used to perform different data manipulations, dependent on the lane size or data element size specified.

Whilst this can lead to some efficiencies in performing certain permutations, any particular instantiation of the instruction within the code will only perform one particular type of permutation. Accordingly, when performing complex operations where sequences of permutations may need to be performed at certain points, it is still necessary to provide separate instructions in the code to perform each particular permutation, and as a result there is an adverse impact on the code density achieved. For example, when performing a Fast Fourier Transform (FFT) process, each stage of the FFT process will typically require a particular data manipulation to be performed, followed by a particular FFT computation, and accordingly separate pieces of code will be required for each stage of the FFT process to define the required manipulations and subsequent FFT computations.

Freescale's Altivec and Intel's Wireless MMX (WMMX) instruction sets provide for performing an unaligned load, which from a programmer's perspective have the effect of loading two SIMD registers with aligned data, and then applying a rotation to the data of the two registers joined together based on the low order bits of an address stored in scalar logic, such that the rotation produces the required data at the unaligned address. The input of the address bits from the scalar side of the machine can hence in this limited situation be used to control the operation on the SIMD side of the machine. Irrespective of the address bits provided, the individual data elements manipulated are always of the same size.

It would be desirable to provide a mechanism for significantly improving SIMD code density for certain algorithms within a SIMD data processing system.

SUMMARY OF THE INVENTION

Viewed from a first aspect, the present invention provides a data processing apparatus comprising: a register data store having a plurality of registers for storing data; processing logic for performing a sequence of operations on data including at least one re-arrangement operation, the processing logic comprising scalar processing logic for performing scalar operations and SIMD processing logic for performing SIMD operations; the SIMD processing logic being responsive to a re-arrangement instruction specifying a family of re-arrangement operations to perform a selected re-arrangement operation from that family on a plurality of data elements constituted by data in one or more registers identified by the re-arrangement instruction, the selected re-arrangement operation being dependent on at least one parameter provided by the scalar processing logic, the at least one parameter identifying a data element width for the data elements on which the selected re-arrangement operation is performed.

In accordance with the present invention, a re-arrangement instruction is provided specifying a family of re-arrangement operations, and the SIMD processing logic is responsive to such an instruction to perform a particular one of those re-arrangement operations on a plurality of data elements composed of data in one or more registers identified by the instruction. The actual re-arrangement operation performed is dependent on at least one parameter provided by the scalar processing logic, that parameter identifying at least a data element width for the data elements on which the selected re-arrangement operation is performed. It has been found that such an approach significantly improves SIMD code density for certain algorithms by reducing the need for code unrolling (where typically more instructions are included in a particular loop to reduce the number of times the loop needs to be repeated). In particular, through use of the present invention, it is possible to perform complex operations using a single loop of code, where on each iteration of the loop a value of the data element width is provided by the scalar processing logic so as to enable the actual re-arrangement operation performed during each iteration of the loop to be altered as required without the need to add further instances of the re-arrangement instruction within the SIMD code itself. Without the technique of the present invention, a programmer would be forced to unroll the code, because separate instructions would be needed for each iteration to identify the particular re-arrangement required for each iteration.

By improving code density, it is possible to reduce power consumption if some form of instruction caching is employed, since as the code footprint becomes smaller, there is a more predictable chance of cache line re-use within such an instruction cache.

As used herein, the term "re-arrangement is used to describe any data movement operation where the output data elements are obtained directly from one or more of the input data elements, and hence all data elements produced by the re-arrangement operation will be data elements that were present as inputs. Hence, such re-arrangement operations include permutation operations where the result produced contains exactly the same data elements as were present at the start, such permutations for example being interleave, de-interleave, transpose, reverse operations, etc. Additionally, such re-arrangement operations may include operations such as duplicate operations where the result is produced by duplicating one or more of the input data elements. This will hence result in one or more of the input data elements not being contained in the output data elements.

The manner in which the data element width is identified by the parameter provided by the scalar processing logic can take a variety of forms. However, in one embodiment, the data element width is specified as a multiple of a default data element width, with the SIMD processing logic being aware of the default data element width. Whilst the default data element width may be predetermined, in one embodiment the default data element width is defined by the re-arrangement instruction. As a result, in such embodiments, the default data element width may vary dependent on the actual re-arrangement instruction being executed.

In some embodiments, the scalar processing logic may be arranged to only provide the data element width to the SIMD processing logic. However, in alternative embodiments, one or more additional parameters may also be provided. For example, in one embodiment, the SIMD processing logic is operable to perform the selected re-arrangement operation in each of a number of lanes of parallel processing defined within said one or more registers identified by the re-arrangement instruction, and said at least one parameter provided by the scalar processing logic further identifies a lane size. By enabling the scalar processing logic to identify not only a data element width, but also a lane size, this further increases the family of re-arrangement operations that can be specified by a particular re-arrangement instruction executed by the SIMD processing logic, thereby enabling a further improvement in code density to be achieved.

The lane size may be specified by the scalar processing logic in a variety of ways. However, in one embodiment, the lane size is specified as a multiple of a default data element width.

As mentioned earlier, the re-arrangement instruction can take a variety of forms. In one embodiment, a number of re-arrangement instructions can be defined, and may for example include an interleave instruction specifying a family of interleave operations, a de-interleave instruction specifying a family of de-interleave operations, a transpose instruction specifying a family of transpose operations, a duplicate instruction specifying a family of duplication operations, and a reverse instruction specifying a family of reverse operations.

Whilst the re-arrangement instructions provided by embodiments of the present invention provide significant flexibility however they are utilised within the code executed by the SIMD processing logic, particular benefits can be achieved when such a re-arrangement instruction is provided within a loop, and in such embodiments the scalar processing logic determines the value of the at least one parameter to be used for each iteration of the loop.

In one embodiment, the scalar processing logic may be arranged to pre-calculate the values of the at least one parameter to be used for each iteration of the loop prior to that loop being executed by the SIMD processing logic. However, in another embodiment, the scalar processing logic and SIMD processing logic are synchronised, and the scalar processing logic operates in parallel with the SIMD processing logic to provide for each iteration the value of said at least one parameter appropriate for that iteration. In one particular embodiment, the value of the at least one parameter to be used for each iteration of the loop is derived from a loop count value maintained by the scalar processing logic. The scalar processing logic will already be used to maintain the loop count value, and the ability to use the loop count value directly to form the parameter used for each iteration of the loop provides a particularly efficient mechanism.

In one example embodiment, the loop executed by the SIMD processing logic is used to perform at least a part of a Fast Fourier Transform (FFT) process. In such embodiments, the re-arrangement instruction included within the loop may take the form of a de-interleave instruction, with the loop also including one or more data processing instructions required in connection with the FFT process, the loop then being repeated multiple times to perform the required FFT process on the plurality of data elements. Typically, the FFT process requires the execution of a number of separate stages, and typically the FFT computation required in each stage would be different due to the need to specify different re-arrangements in each stage. However, in accordance with the above-mentioned technique of an embodiment of the present invention, the actual FFT computation required for each stage can be kept the same, but on each iteration of the loop the de-interleave instruction will cause a different de-interleave operation to be performed dependent on the data element width provided by the scalar processing logic. This provides a particularly efficient mechanism for performing such an FFT process, since the same loop of code can be used to perform each stage of the FFT process, thereby resulting in significantly improved code density.

In one such embodiment, the number of times the loop is repeated is dependent on the number of data elements of a default data element width on which the FFT process is performed.

In one embodiment, the loop is used to perform at least part of a matrix transposition process, and the re-arrangement instruction(s) placed in the loop may consist of one or more transpose instructions. In such embodiments, the loop is repeated multiple times to perform the required matrix transposition process on a plurality of data elements.

In one particular embodiment, the re-arrangement instruction is provided within a subroutine, such that the same subroutine can be used to perform any of the family of re-arrangement operations dependent on at least one parameter provided by the scalar processing logic. By such an approach, the re-use of such a sub-routine can be significantly enhanced.

The at least one parameter provided by the scalar processing logic can be provided in a variety of ways. In one embodiment, such a parameter is stored by the scalar processing logic in one of the registers for access by the SIMD processing logic. However, in an alternative embodiment, it may be generated on-the-fly for passing to the SIMD processing logic when required.

In one embodiment, if the parameter provided by the scalar processing logic to define the data element width is greater than or equal to the size of each of the one or more registers identified by the re-arrangement instruction, no re-arrangement operation is performed by the SIMD processing logic. Alternatively, for at least one re-arrangement instruction, a particular re-arrangement could be associated with such a data element width. For example, for a transpose instruction, if the data element width provided is greater than or equal to the size of each of the one or more registers, then the SIMD processing logic could be arranged to perform either no re-arrangement or alternatively to perform a swap operation if this were considered more useful.

The register data store may be arranged in a variety of ways. However, in one embodiment, the register data store comprises a plurality of scalar registers for storing data for access by the scalar processing logic and a plurality of SIMD registers for storing data for access by the SIMD processing logic, the at least one parameter being routed from one of said scalar registers to the SIMD processing logic to cause a specific re-arrangement operation to be selected from said family of re-arrangement operations specified by the re-arrangement instruction. In an alternative embodiment, the at least one parameter to be provided to the SIMD processing logic may be provided within a SIMD register.

Viewed from a second aspect, the present invention provides a method of performing re-arrangement operations within a data processing apparatus having a plurality of registers for storing data and processing logic for performing a sequence of operations on data including at least one re-arrangement operation, the processing logic comprising scalar processing logic for performing scalar operations and SIMD processing logic for performing SIMD operations, the method comprising the steps of: in response to a re-arrangement instruction specifying a family of re-arrangement operations, causing the SIMD processing logic to perform a selected re-arrangement operation from that family on a plurality of data elements constituted by data in one or more registers identified by the re-arrangement instruction; and providing from the scalar processing logic at least one parameter, the selected re-arrangement operation being dependent on said at least one parameter and said at least one parameter identifying a data element width for the data elements on which the selected re-arrangement operation is performed.

Viewed from a third aspect, the present invention provides a computer program product comprising a computer program operable when executed on a data processing apparatus to cause the data processing apparatus to operate in accordance with the method of the second aspect of the present invention, the computer program comprising at least one re-arrangement instruction.

BRIEF DESCRIPTION OF THE DRAWINGS

The present invention will be described further, by way of example only, with reference to embodiments thereof as illustrated in the accompanying drawings, in which:

FIGS. 3 to 8 schematically illustrate a number of re-arrangement instructions supported by embodiments of the present invention and in particular the associated family of re-arrangement operations supported by each re-arrangement instruction dependent on parameters provided by the scalar processing logic;

DESCRIPTION OF EMBODIMENTS

Figure 1:
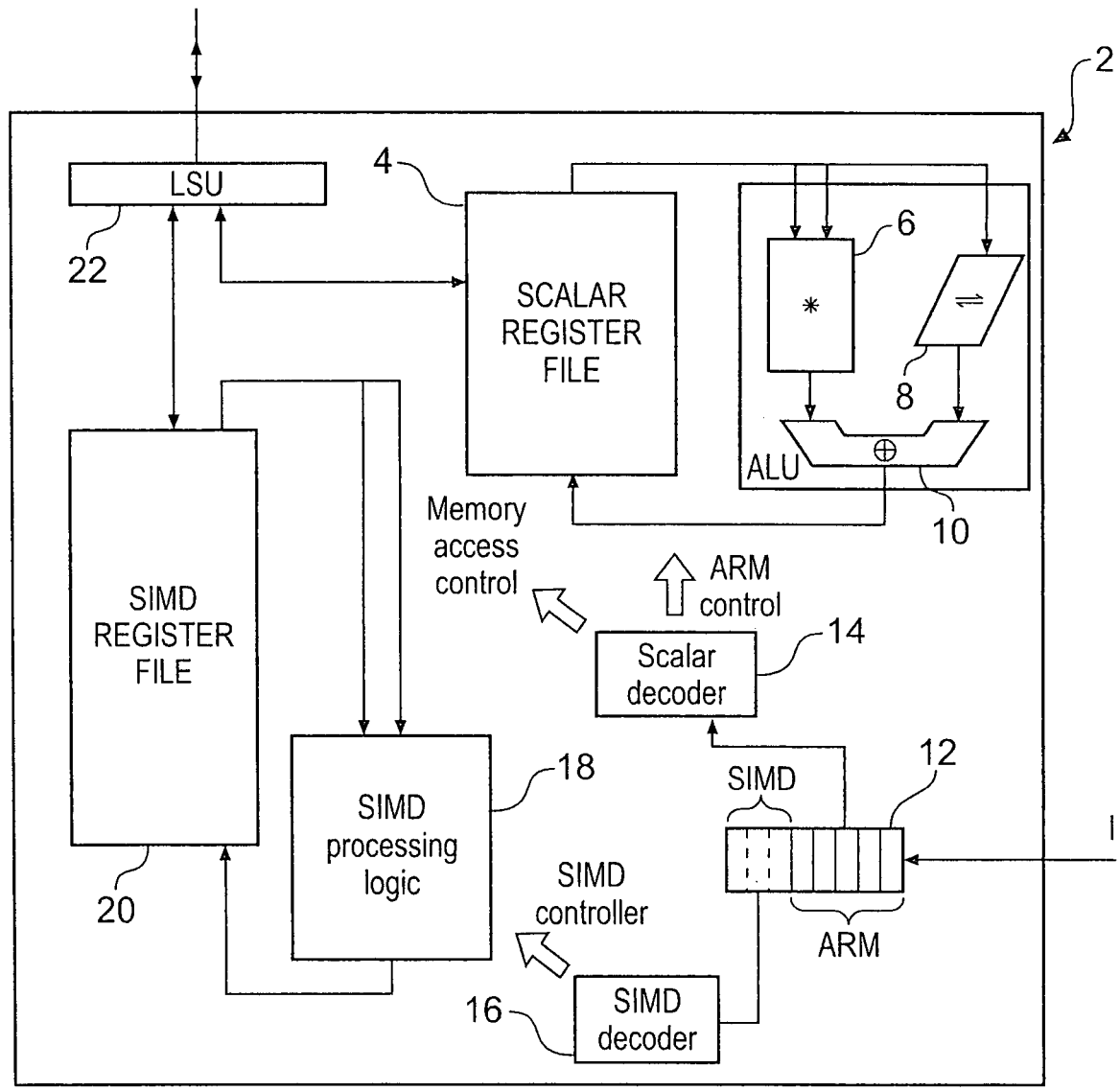
FIG. 1 schematically illustrates a data processing system supporting both conventional scalar data processing and SIMD data processing.

FIG. 1 schematically illustrates a data processing system (for example an integrated circuit) 2 incorporating both a scalar data processing functionality and a SIMD data processing functionality. The scalar data processing portion can be considered to be a standard ARM processor core incorporating a scalar register data store 4, a multiplier 6, a shifter 8, an adder 10, an instruction pipeline 12 and a scalar decoder 14 as well as many other circuit elements which have not, for the sake of clarity, been illustrated. In operation, such a scalar processor core stores fixed length 32-bit data values within the scalar register data store 4 and manipulates these using the multiplier 6, shifter 8 and adder 10 under control of data processing instructions passed along the instruction pipeline 12 and supplied to the scalar decoder 14. The scalar decoder 14 produces control signals which control the operation of the scalar processing elements.

As illustrated in FIG. 1 the data processing system 2 includes various dedicated SIMD processing elements including a SIMD register data store 20 and dedicated SIMD processing logic 18. A load store unit 22 is shared with the scalar portion and could be the same or a modified version of the load store unit conventionally found within a scalar processor.

The instruction pipeline 12 is extended with additional pipeline stages which serve to control SIMD processing operations via a dedicated SIMD decoder 16. (It will be appreciated that in other embodiments the SIMD pipeline may be provided in parallel with the scalar pipeline, or instead both may be completely fused in a single pipeline.) The SIMD decoder 16 generates SIMD control signals which control the operation of the SIMD processing elements, such as reading of SIMD registers, writing of SIMD registers and the configuration of the SIMD processing logic so as to perform the desired data processing operations.

The scalar register data store 4 can in this example be considered as being divided into a fixed number of fixed length registers, such as the conventional 16 32-bit ARM registers. In contrast, the SIMD register data store 20 provides a block of storage which may be addressed/accessed in a flexible way depending upon the parameters associated with the SIMD data processing instruction concerned. More particularly, the SIMD data processing instruction specifies source and destination register numbers, and optionally data element sizes and register sizes associated with the data processing instruction. These parameters are together combined by the SIMD decoder 16 and read/write ports of the register data store 20 to control the mapping of the different portions and accordingly data elements stored within the SIMD register data store 20 to the register being accessed. Thus, SIMD registers of differing sizes, differing data element sizes and the like can effectively be aliased together (i.e. these registers can be considered as overlapping and accessible via different register specifiers, register size and data element size combinations as may be desired. The SIMD decoder 16 and the read/write ports can be considered to provide register accessing logic in this example embodiment).

Figure 2:
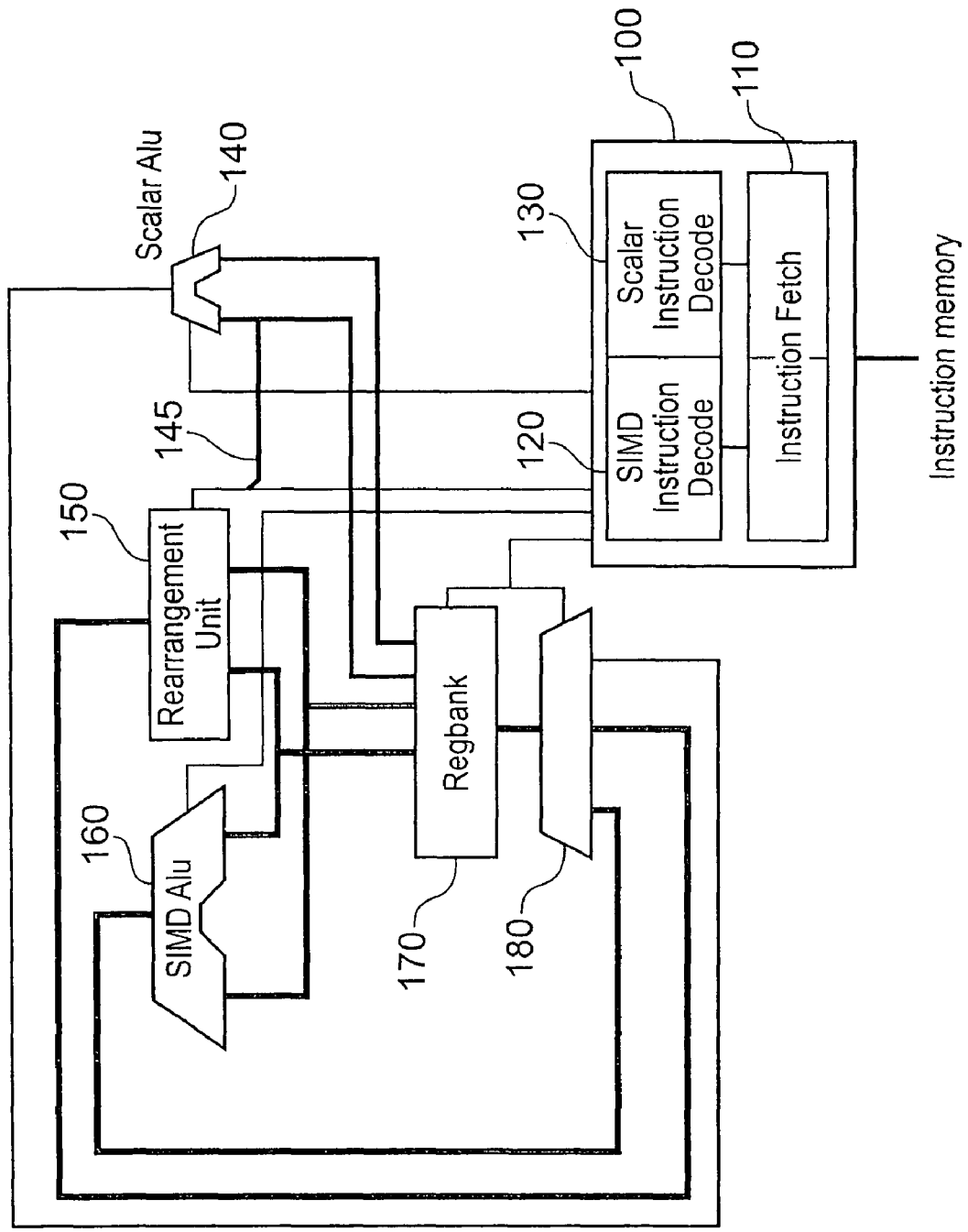
FIG. 2 is a block diagram schematically illustrating the operation of a re-arrangement unit provided as part of the SIMD processing logic in accordance with one embodiment of the present invention.

FIG. 2 is a block diagram illustrating the operation of a re-arrangement unit 150 provided as part of the SIMD processing logic in accordance with one embodiment of the present invention. Instruction fetch logic 110 within the fetch and decode unit 100 fetches instructions from memory in order to produce the instruction pipeline 12 illustrated schematically in FIG. 1. Thereafter, scalar instructions are forwarded to the scalar instruction decode unit 130, which is analogous to the scalar decoder 14 to FIG. 1, whilst SIMD instructions are routed to the SIMD instruction decode unit 120, which is analogous to the SIMD decoder 16 of FIG. 1. The instruction fetch and decode functions can be combined into one unit for both SIMD and scalar instructions, or alternatively the SIMD and scalar paths may be implemented completely separately. Alternatively, some combination of these two approaches may be taken, such as shown in FIG. 2 where the instruction fetch logic is shared by both paths, but separate instruction decoders are provided for the SIMD and scalar instructions. For example, a unit such as unit 100 would typically be used for processor cores providing separate SIMD processing logic, such as the processor cores developed by ARM Limited using ARM's Neon SIMD technology. Alternatively, for very long instruction word (VLIW) implementations, a single unit providing a single instruction fetch and a single decode block is likely to be used.

As can be seen from FIG. 2, as a result of decoding SIMD and scalar instructions, various control signals are sent to the multiplexer 180, the register bank 170, the SIMD arithmetic logic unit (ALU) 160, the re-arrangement unit 150 and the scalar arithmetic logic unit 140 to control such logic to perform the required operations defined by the instructions. The SIMD ALU 160 and re-arrangement unit 150 can be considered to be provided within the SIMD processing logic 18 of FIG. 1, whilst the scalar ALU 140 will contain the multiplier 6, shifter 8, and adder 10 illustrated in FIG. 1. In FIG. 2, the register bank 170 is shown as a unified register bank, in which scalar values may be derived from a selected element within a selected SIMD register. However, it will be appreciated that the register bank 170 may comprise of more than one SIMD register file, and indeed there may be one or more separate SIMD and scalar register files, as for example illustrated in FIG. 1. Whilst in FIG. 2 the SIMD ALU 160 and rearrangement unit 150 are shown in parallel, they could in an alternative embodiment be provided in series.

In accordance with embodiments of the present invention, and as shown in FIG. 2, scalar values passed to the scalar ALU 140 from the register bank 170 may be routed over path 145 to form one or more control inputs to the re-arrangement unit 150. In particular, these control signals are used to specify at least a data element width to be associated with the data input to the re-arrangement unit 150, thereby identifying a particular re-arrangement operation from a family of re-arrangement operations that can be specified by a single re-arrangement instruction decoded by the SIMD instruction decode logic 120. Hence, a single re-arrangement instruction specifying for example two input registers may be decoded by the SIMD instruction decode logic to cause the data in those registers to be forwarded from the register bank 170 to the re-arrangement unit 150. The SIMD instruction decode logic 120 will also provide control signals to the re-arrangement unit 150 defining the type of re-arrangement to be performed, for example an interleave, a de-interleave, a transpose, a duplicate, a reverse, etc, this being dependent on the re-arrangement instruction decoded. In addition, the control signal received over path 145 from the scalar logic will identify the data element width to be associated with the input data, and thereby will identify the exact form of re-arrangement operation to be performed by the re-arrangement unit. The resultant data produced by the re-arrangement unit 150 can then be routed via the multiplexer 180 back into one or more destination registers of the register bank 170. Often, the destination registers will be the same as the source registers, such that the re-arrangement data is written over the previous contents stored in those registers. However, alternatively separate destination registers may be specified.

Also, it will be appreciated that rather than storing the result data in the register bank 170, it may be sent directly over a forwarding path as an input to the SIMD ALU 160 to enable it to form source data for a subsequent SIMD data processing operation.

There are a number of re-arrangement instructions that can be used in embodiments of the present invention, each such instruction specifying a family of re-arrangement operations, and the parameter (scalar value) provided from the scalar logic identifying the particular re-arrangement operation from that family to be performed. FIGS. 3 to 8 schematically illustrate the instructions provided in a particular embodiment of the present invention, and for each instruction identify the family of operations that can be performed dependent on the scalar value provided.

Starting with FIG. 3, this schematically illustrates an operation performed as a result of a zip instruction, also known as an interleave instruction. The instruction will specify a default data element width, and in this embodiment it is assumed that eight such basic data elements are contained in each of two source registers (register 0 and register 1) identified by the instruction. Hence, it is assumed that source register 0 contains the data items 0, 1, 2, 3, 4, 5, 6, 7, each data item being of a default data element width, whilst similarly the source register 1 contains data items 8, 9, A, B, C, D, E, F. It should be noted that in this embodiment the scalar value provided over path 145 can have a value of 0, 1, 2, or 3 or more. A scalar value of 0 indicates a data element width of 1, a scalar value of 1 indicates a data element width of 2, a scalar value of 2 indicates a data element width of 4, and a scalar value of 3 or more indicates a data element width of 8 or more.

As shown in FIG. 3, if the data element width as identified by the scalar value passed over path 145 from the scalar logic is set to one, meaning that the data element width is the default data element width, then the result achieved by the zip operation is as shown in the second column of FIG. 3. As can be seen from the second column of FIG. 3, if the data element width is 1, then a standard interleave operation takes place where each data item in one source register is interleaved with corresponding data items in the other source register.

Considering the middle column of FIG. 3, if the data element width is instead specified as 2, then each pair of data items is considered together to form an individual data element and hence the standard interleave operation is performed in respect of each pair of data items. Similarly, if the data element width is set to 4, then each group of four data items are considered to constitute an individual data element, and hence each source register only contains two data elements. As a result, the interleave operation produces the result shown in the fourth column of FIG. 3. With regard to the final column, if the data element width is specified to be equal to or greater than the register width, i.e. greater than or equal to 8, then no re-arrangement takes place, and the result is identical to the input.

FIG. 4 is a similar diagram to FIG. 3, but illustrates a de-interleave operation performed as a result of decoding an unzip instruction, again for the instances where the data element width is 1, 2, 4, or greater than or equal to 8. It will be noted that if the data element width is set equal to 4, such that there are only two data elements in each input register, then the result achieved is the same as for the zip instruction of FIG. 3. Also, as with the zip instruction of FIG. 3, if the data element width is specified to be greater than or equal to 8, no re-arrangement takes place.

FIG. 5 is a similar diagram to the preceding two figures, but illustrates the operations that can be performed as a result of decoding a transpose instruction, again for the variants where the data element width is specified to be 1, 2, 4 or greater than or equal to 8. Again, if the data element width is set to be 4, the result achieved is the same as for the zip or unzip instructions. If the data element width is specified to be greater than or equal to 8, then in one embodiment no re-arrangement takes place. Alternatively, the re-arrangement logic may be arranged to perform a simple swap such that the contents of register 0 are stored in register 1 and the contents of register 1 are stored in register 0.

FIG. 6 illustrates a duplicate operation performed as a result of decoding a duplicate instruction. Typically, a duplicate instruction will only specify a single source register, as indicated by FIG. 6. If the data element width is set equal to 1, then this will result in the first data item 0 being replicated across the entire register width. If the data element width is set equal to 2, then data items 0 and 1 are considered to form a single data element and this single data element is replicated across the entire register width. Similarly, if the data element width is set equal to 4, then the four data items 0, 1, 2, 3 are considered to form a single data element which is then replicated across the entire register width. If the data element width is greater than or equal to 8, then no re-arrangement takes place.

FIG. 7 illustrates an alternative variant of the duplicate instruction where in addition to receiving a data element width over path 145 from the scalar processing logic, a lane size is also specified by the scalar processing logic. Based on the lane size, the re-arrangement logic is arranged to define a number of lanes of parallel processing in the specified source register or source registers, with the same operation then being replicated in each lane. If the lane size is set equal to 8, i.e. indicating that the lane size corresponds to the width of the source register, then the results achieved are the same as those described earlier with reference to FIG. 6. However, if the lane size is set equal to 4, thereby identifying two separate lanes within the source register, then different results are obtained dependent on whether the data element width is set equal to 1, 2 or greater than or equal to 4. In particular, as can be seen from FIG. 7, if the data element width is chosen to be 1 whilst the lane width is 4, then the selected data element in the first lane will be data item 0 and the selected data element in the second lane will be data item 4, with those data elements then being replicated in their respective lanes. Similarly if the data element width is set equal to 2, then the data element in the first lane will be formed from data items 0 and 1 and the data element in the second lane will formed from data items 4 and 5, with those data elements then being replicated within their respective lanes. If the data element width is greater than or equal to 4, no re-arrangement takes place.

As also shown in FIG. 7, if the line size is set equal to 2, thereby defining four lanes within the source register, then there are two possible results that can be achieved depending on whether the data element width is set equal to 1 or the data element width is set to be greater than or equal to 2. The interesting case in this instance is where the data element width is 1, which results in the data item 0 being replicated in the first lane, the data item 2 being replicated in the second lane, the data item 4 being replicated in the third lane and the data item 6 being replicated in the fourth lane.

Finally, if the lane size is set equal to 1, i.e. identifying eight lanes of parallel processing within the source register, then irrespective of the data element width specified, no re-arrangement is performed.

FIG. 8 illustrates the operations that may be performed in response to a reverse instruction, again for situations where the data element width is set equal to 1, 2, 4 or greater than or equal to 8. As can be seen, the basic operation involves reversing each of the data elements within the source register. When the data element width is equal to the default data element width, then the order of each data item is reversed. However, if the data element width is set equal to 2, then each pair of data items forms a single data element, and the ordering of the four resultant data elements is reversed. Similarly, if the data element width is set equal to 4, then this produces two data elements within the source register, and the ordering of these two data elements is reversed. As with the other instructions, if the data element width is greater than or equal to 8 no re-arrangement takes place.

Given the above discussions, it will be seen that a single re-arrangement instruction can be specified in the SIMD code, with this single re-arrangement instruction in effect enabling any of a family of re-arrangement operations to be performed, with the actual instance of that family performed being dependent on the one or more parameters provided over path 145 from the scalar logic. This can significantly improve code density within the SIMD code, and provides a great deal of flexibility in how each such re-arrangement instruction is used. The benefits are particularly marked when such a re-arrangement instruction is introduced within a loop, since it is then possible to arrange for a different re-arrangement operation to be performed on each iteration through the loop, by causing the scalar logic to issue a different scalar value over path 145 for each such iteration of the loop. In particular, the SIMD processing logic and scalar processing logic will often be synchronised, and in particular the scalar logic may be used to maintain a loop counter used to control the number of times the SIMD processing logic executes a particular loop of SIMD instructions. In certain instances, the loop counter value itself can be used as the scalar value routed to the re-arrangement unit to ensure that on each iteration through the loop, the re-arrangement unit performs a different re-arrangement operation within the family of re-arrangement operations specified by the re-arrangement instruction within that loop. A particular embodiment where this can prove very useful is when performing an FFT process within the SIMD processing logic.

Figure 9:
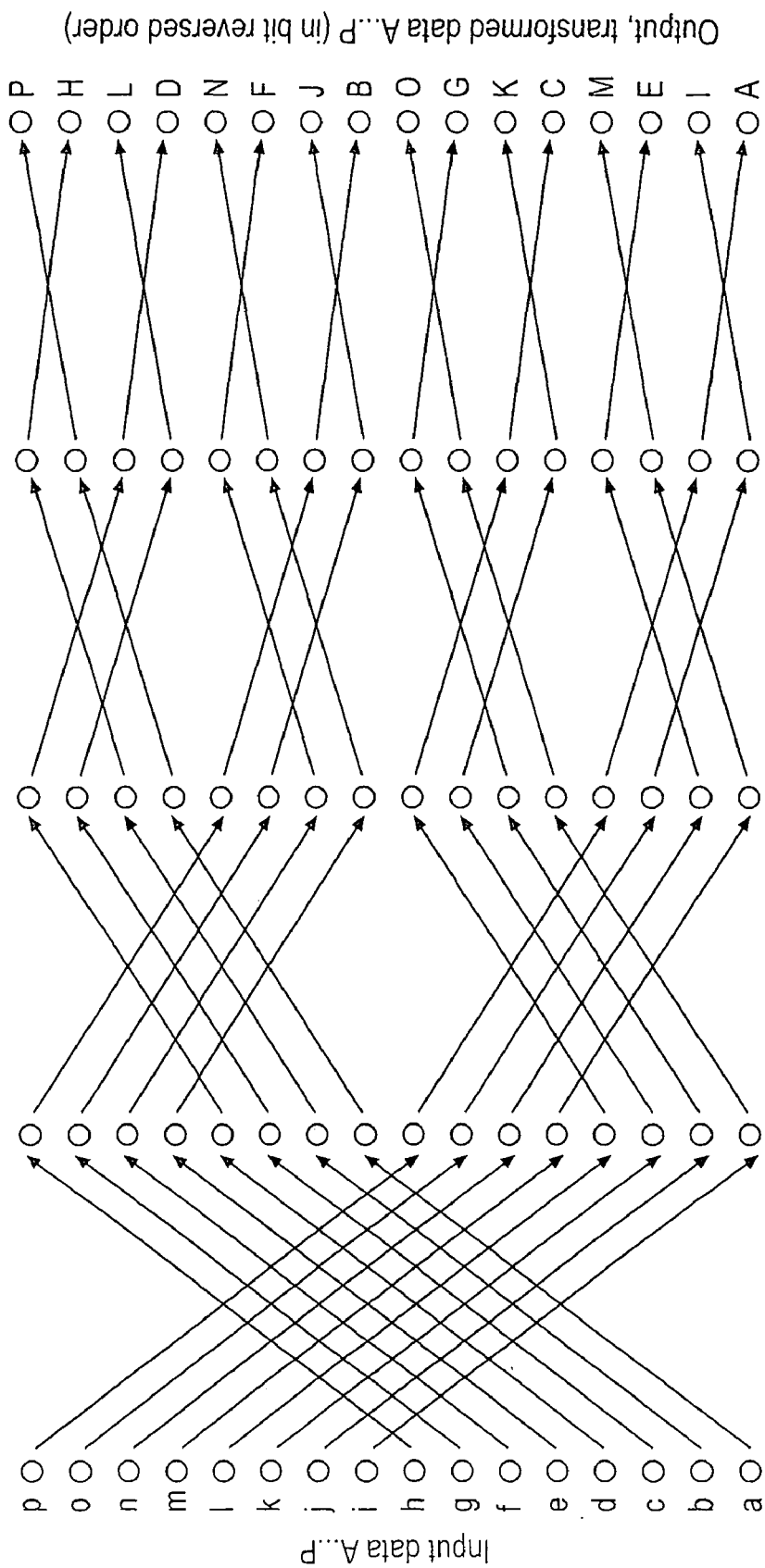
FIG. 9 is a diagram schematically illustrating the basic FFT data flow in accordance with a standard FFT process.

FIG. 9 is a diagram showing the basic FFT data flow in accordance with a standard FFT process, such as for example described in more detail in the publication "Digital Signal Processing" by J Proakis and D Manolakis, published by Prentice Hall, 1996. As can be seen from FIG. 9, the FFT process involves a number of separate stages, and at each stage, an FFT butterfly operation is performed, involving computations in respect of the complex input data (involving real and imaginary components) to that stage. Sixteen input data items are shown in FIG. 9, and the result achieved consists of sixteen data items. It will be appreciated that there is no direct dependency between a particular input data item indicated by a letter in lower case text and an output data item indicated by a letter in upper case text, and typically each output data item will have a value which depends on all of the input data items. As will be appreciated by those skilled in the art, the data items may be ordered by time at the start, and as a result of the FFT process will be ordered by frequency. Alternatively, they may be ordered by frequency at the start, and ordered by time at the end following the FFT process.

It will be appreciated from FIG. 9 that the computations performed at each stage are different, and hence typically to perform the operation illustrated schematically in FIG. 9, four separate code sections need to be written. Further, it should be noted that the transformed data A ... P produced at the output is in bit reversed order with respect to the input data.

Figure 10:
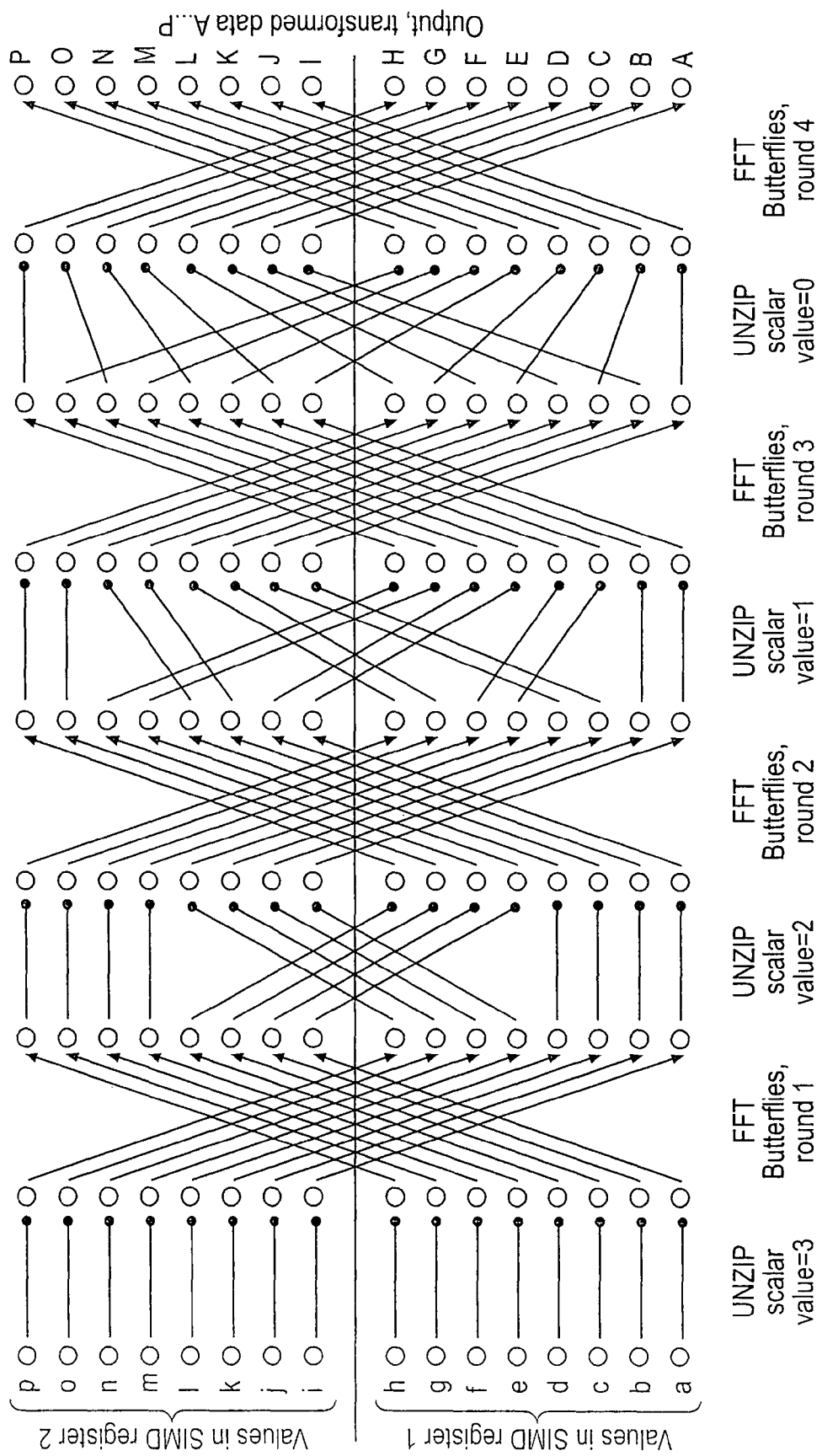
FIG. 10 illustrates the FFT data flow in accordance with one embodiment of the present invention, where the re-arrangement unit of FIG. 2 is arranged to perform an unzip operation between each iteration of the FFT algorithm.

FIG. 10 illustrates how the same FFT process illustrated in FIG. 9 can be replicated using the re-arrangement unit 150 and SIMD ALU 160 of embodiments of the present invention. In particular, as can be seen from FIG. 10, a re-arrangement operation is performed between each FFT butterfly stage. In particular, an unzip instruction as schematically illustrated earlier with reference to FIG. 4 is used, which takes two registers as input, and generates two registers worth of results. As a result of the unzip operation all of the even numbered data elements of the two input registers are collected in ascending order in one of the result registers and all of the odd numbered data elements are arranged in ascending order in the other result register. However, on each iteration, a different scalar value is provided to the re-arrangement unit 150 over path 145, as a result of which the width of the data elements changes for each iteration, thereby causing the different re-arrangements as illustrated in FIG. 10.

Also of note is the fact that by using the unzip instruction in such a manner, the actual FFT butterfly operation required in each iteration is exactly the same, and hence there is no need for the four different code sections as illustrated schematically in FIG. 9. Instead, a single loop can be defined containing the unzip instruction followed by a single FFT butterfly routine. On each iteration through the loop, a loop counter can be used to provide the scalar value. Hence, assuming four iterations through the loop are required, the loop counter will take a value of 3 on the first iteration, 2 on the second iteration, 1 on the third iteration and 0 on the fourth iteration. The element width is then determined by the re-arrangement unit 150 as being equal to base element width×$\log_2$ (scalar value). As a result, the data element width for the first iteration is equal to the register width and accordingly no re-arrangement takes place, for the second iteration the data element width is equal to four times the default data element width, on the third iteration the data element width is twice the default data element width, and on the final iteration the data element width is the default data element width.

As a result of the above described technique, the entire FFT process can be compactly represented by a single loop containing the unzip instruction and a particular FFT butterfly routine, which yields very significant code density improvements within the SIMD code.

In particular, using the approach described in FIG. 10, the required code to perform the FFT process illustrated can be written as follows:

```
#define LOG2_REG_WIDTH 2    (replaces occurrences of
                             LOG2_REG_WIDTH with
                             the value 2)
#define REG_WIDTH (1<<LOG2_REG_WIDTH)
typedef struct SIMD{
    int Reg[REG_WIDTH];
}SIMD;
for (i= (LOG2_REG_WIDTH)+1); i>=0; --i)
    UNZIP((SIMD) register_1, (SIMD) register_2, i);
    FFT_Butterfly((SIMD) register_1, (SIMD) register_2);
```

FFT_Butterfly is a sub-routine used to perform the FFT butterfly process illustrated in each stage of FIG. 10.

Considering in a bit more detail what goes on in the FFT_Butterfly function, it is found that for each element the following calculation is performed (assuming each variable is complex, i.e. has a real and imaginary component, and each operation correspondingly operates on both the real and imaginary operand components to produce a real and imaginary result):

Result_0[Element#]=register_0[Element#]+register_1[Element#]; Tmp_1[Element#]=register_0[Element#]−register_1[Element#]; Result_1[Element#]=Tmp_1*Twiddle[Element#];

Complex addition

Out.*r*=In0.*r*+In1.*r*;

Out.*i*=In0.*i*+In1.*i*;

Complex Subtraction

Out.*r*=In0.*r*−In1.*r*;

Out.*i*=In0.*i*−In1.*i*;

Complex Multiplication

Out.*r*=In0.*r*\*In1.*r*−In0.*i*\*In1.*i*;

Out.*i*=In0.*r*\*In1.*i*+In0.*i*\*In1.*r*;

where ".r" is the real component and ".i" is the imaginary component of a complex number.

Now the interesting thing is the generation of the twiddle values, which are the coefficients that are used in the multiplication within the FFT butterfly sub-routine. In the case considered in FIG. 10 (ie register width of 8) the pattern in the twiddle values is Round 1
{T[0],T[1],T[2],T[3],T[4],T[5],T[6],T[7]} . . . where the twiddles are complex numbers.

The sequence shown will be contained in a SIMD register comprising of 8 complex elements. The number in the square brackets refers to the value N which defines the value of the twiddle according to the equation:
$T[N]=e^{(-j*N*2*\pi/(2*REG\_WIDTH))}$—this is a standard mathematical result for FFTs, and j is the square root of −1.

Round 2
{T[0],T[2],T[4],T[6],T[0],T[2],T[4],T[6]} (lane width=4)
Round 3
{T[0],T[4],T[0],T[4],T[0],T[4],T[0],T[4]} (lane width=2)
Round 4
{T[0],T[0],T[0],T[0],T[0],T[0],T[0],T[0]} (lane width=1)

Clearly the required re-arrangement of the twiddle values is not a permutation as not all the elements in the input data set are represented in the resultant data set, and some elements in the input data set appear more than once in the resultant data set.

The specific operation above could be described as:

```
void EVDUP(SIMD &OperandReg, SIMD &Result, int ScalarValue){
int i,j,N;
int INC;
    /*Range check, and calculate the increment value */
    ScalarValue = ScalarValue>LOG2_REG_WIDTH?0:ScalarValue;
    INC = REG_WIDTH/(REG_WIDTH>>ScalarValue);
    /*Collect data at required Element Numbers */
    for(i=0,N=0;N<(REG_WIDTH);N+=INC,i++)
        Result.Reg[i]=OperandReg.Reg[N];
    /*Duplicate the extracted data so that it fills the whole
SIMD register */
    for(j=0;i<(REG_WIDTH);j++,i++)
        Result.Reg[i]=Result.Reg[j];
}
```

In the following text, the operation described above has been called "Extract Duplicate" or EVDUP.

```
//Define variables and their types
SIMD register_1, register_2, Twiddle;
SIMD INITIAL_TWIDDLE = {T[0],T[1],T[2],T[3],T[4],T[5],T[6],T[7]};
SCALAR j,i;
//FFT loop
for (j=0,i= (LOG2_REG_WIDTH)+1); i>=0; --i,++j)
    UNZIP((SIMD) register_1, (SIMD) register_2,SCALAR i);
    Twiddle=EVDUP(INITIAL_TWIDDLE, j);
    FFT_Butterfly((SIMD) register_1, (SIMD) register_2,
    (SIMD) Twiddle);
```

As a result, it will be seen that for each iteration of the FFT butterfly routine, the input data values are those shown in FIG. 10, along with the twiddle values created by the EVDUP instruction described above. The above code has been found to provide a particularly efficient mechanism for generating the various twiddle values required for each iteration of the FFT butterfly routine.

Figure 11:
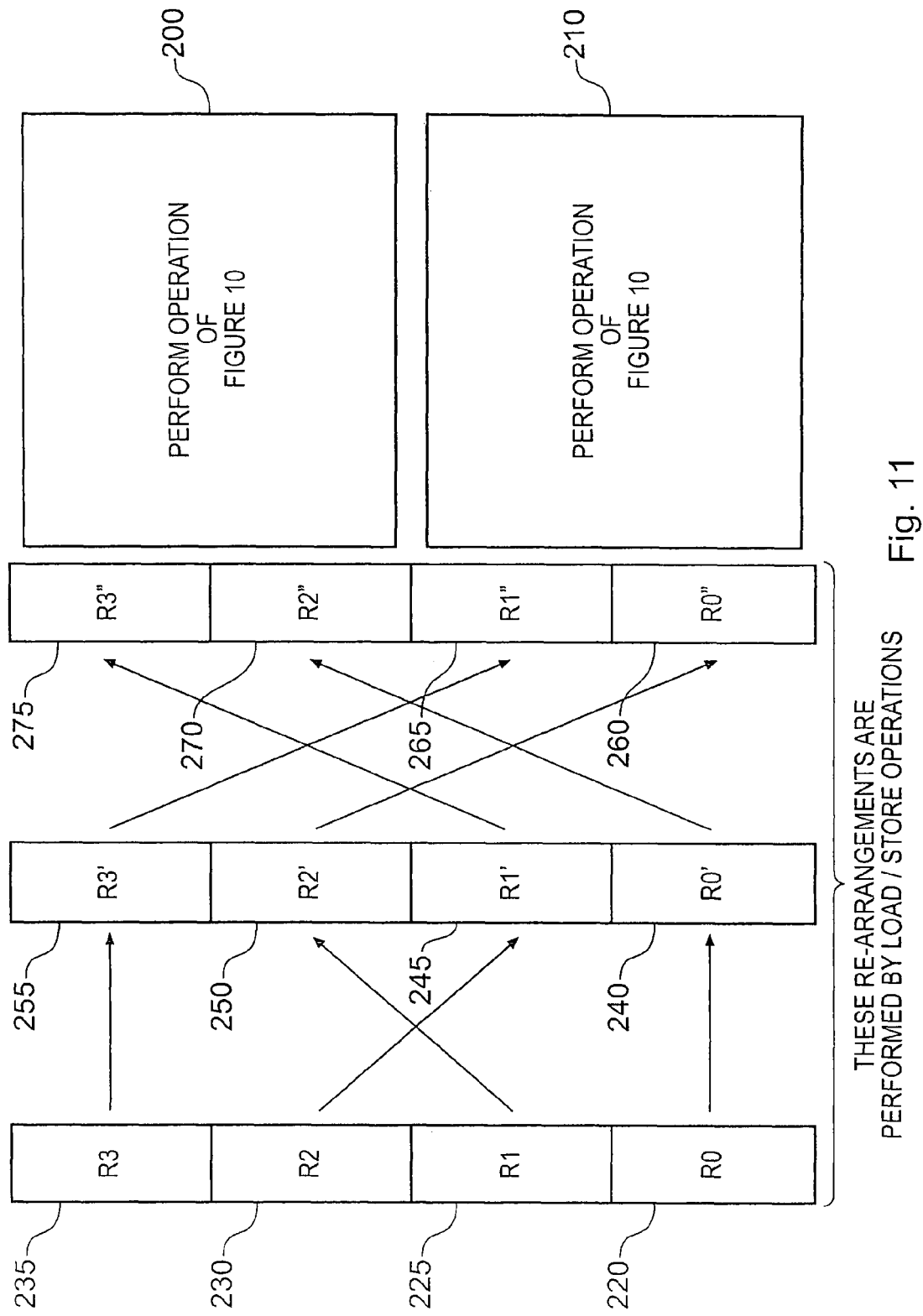
FIG. 11 is a diagram schematically illustrating how the technique of FIG. 10 can be applied to input operands that exceed the maximum SIMD width specifiable by an instruction in accordance with embodiments of the present invention.

The technique described with reference to FIG. 10 is not only applicable to situations where the FFT input data is no wider than the SIMD width, namely the maximum width specifiable by an instruction (which in the example of FIG. 10 is twice the register width). If the FFT width exceeds the SIMD width, then some preliminary re-arrangements and FFT butterfly routines can be performed as illustrated in FIG. 11 prior to reaching a point where the loop of instructions used to perform the process of FIG. 10 can be used as indicated by boxes 200, 210 of FIG. 11. The required re-arrangements required in the preliminary stages can be performed by a combination of load and store instructions with a pattern of addresses being generated such that the data is re-arranged using the same patterns as for an UNZIP operation (in this case the default data element width is a register width and the scalar value indicates a data element width that is one or more times the register width). Hence, when the data element width is greater than or equal to the register width, multiple load and store operations are used to synthesis the required data element width.

Hence, considering the example of FIG. 11, the SIMD width is twice the register width, and the input FFT data is four times the register width and comprises four vectors R0 220, R1 225, R2 230 and R3 235. A re-arrangement (UNZIP) stage takes the data element width to be the register width (i.e. the default data element width) and produces re-arranged vectors R0' 240, R1' 245, R2' 250 and R3' 255 and then an FFT butterfly stage is performed to produce result vectors R0" 260, R1" 265, R2" 270 and R3" 275. In particular, the following steps are performed:

1. Calculate the base address B of the vectors R0 through to R3 in a source buffer, and the base address B' of the vectors R0' though to R3' in a destination buffer, together with the offsets to the specific vectors which will be referred to hereafter as addresses A0, A1, A2 and A3, such that B+A0 provides the absolute address of the vector R0, and B'+A0 provides the absolute address of the vector R0'.
2. Load R0 and R1 from addresses B+A0 and B+A1 into working registers, for example register_1 and register_2.
3. Store the registers register_1 and register_2 onto the destination buffer at the addresses B'+A0 and B'+A2 respectively.
4. Load R2 and R3 from addresses B+A2 and B+A3 into working registers, for example register_1 and register_2.
5. Store the registers register_1 and register_2 onto the destination buffer at the addresses B'+A1 and B'+A3 respectively, completing the UNZIP operation.
6. Loading R0' and R2', and using the appropriate value for Twiddle, call FFT_Butterfly, writing the results (R0" and R2") back into the destination buffer in memory addressed by B'+A0 and B'+A2.
7. Repeat step 6 with data R1' and R3' using addresses B'+A1 and B'+A3.

Considering embodiments of the present invention where loops are employed, the number of iterations of the loop required will typically depend on the SIMD width, i.e. the number of default width data elements subjected to the SIMD operation. Accordingly, considering FIG. 10, there are 16 elements of the default data element width contained within the SIMD width. The number of iterations is given by $\log_2 16$, which equals 4, thereby indicating that 4 iterations are required.

The instructions used in embodiments of the present invention can be useful in a variety of situations. Whilst one example has been given with respect to performing FFT operations, it will be appreciated that there are many other suitable operations that may take advantage of these instructions. By way of example, another operation that can usefully make use of the techniques of embodiments of the present invention is a transpose operation used to transpose a matrix. A real life application of such a transpose operation is to convert an image from being a portrait to a landscape view. Such a transpose operation is illustrated schematically in FIG.

Figure 12:
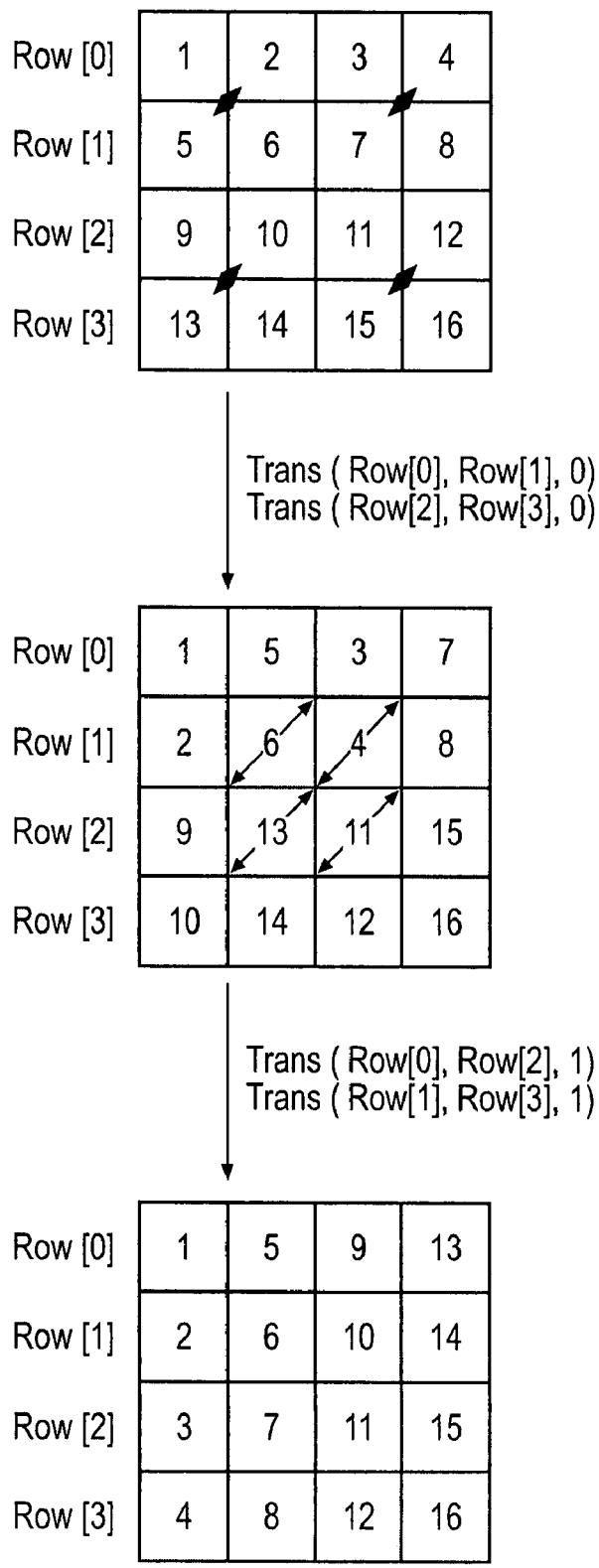
FIG. 12 is a diagram schematically illustrating a transpose operation that may be performed using the re-arrangement unit of FIG. 2 in accordance with one embodiment of the present invention.

12. As shown by the first box in FIG. 12, a first transpose instruction operates in respect of rows 0 and 1, and a scalar value of 0 is provided to specify a data element width of 1, i.e. the same as the default data element width. As a result, each row contains 4 input data elements, and the transpose operation involves transposing data elements 2 and 5 and 4 and 7. The same transpose operation is then performed again, but in this case in respect of rows 2 and 3, again with a scalar value of 0 specifying a data element width of 1.

On the next iteration, the first transpose operation involves rows 0 and 2, with a scalar value of 1, thereby identifying a data element width of 2. As a result, each row contains two data elements, and accordingly the data element comprising data items 9 and 13 is swapped with the data element comprising data items 3 and 7. Similarly, the next transpose operation involves rows 1 and 3, again specifying a scalar value of 1 and hence a data element width of 2. As a result, the data element comprising data items 10 and 14 is swapped with the data element comprising data items 4 and 8. As a result, it can be seen by the last box in FIG. 12 that the matrix of data has then undergone a transposition, which from a practical point of view may as described earlier convert an image from a portrait to a landscape view, or vice versa. The code that can be used to perform the transpose operation illustrated in FIG. 12 may in one embodiment take the following form:

```
for(Log2Stage=0;Log2Stage<Log2Rows;Log2Stage++){
    Stage = 1<<Log2Stage;
    Mask = 0-Stage;
    for(y=0;y<NumRows_2;y++){
        offset=y&Mask;
        trans(Row[y+offset],Row[y+offset+Stage],Log2Stage);
    }
}
```

In this example, the value Log2Stage is a scalar value provided from the scalar logic taking the form of a counter value.

From the above discussions of embodiments of the present invention, it will be seen that such embodiments provide a mechanism to significantly improve SIMD code density for certain algorithms by avoiding the need for code unrolling. By improving code density, power consumption can be reduced, particularly when some form of instruction caching is employed, since the smaller the code footprint, the more predictable the chance of cache line re-use.

In accordance with an embodiment of the present invention, a processing machine is provided with scalar and SIMD pipelines whose processing is in lock step (i.e. only one program counter). One of the SIMD pipelines forms a re-arrangement network, which can range from simple re-arrangement up to the functional equivalent of a crossbar switch, allowing any data element to be moved anywhere thereby allowing any re-arrangements to be achieved. In accordance with embodiments of the present invention, the re-arrangement applied to the input. SIMD operands is one of a family of operations defined by a particular instruction, with one or more parameters provided by a register value supplied by the scalar pipeline being used to define the particular operation within the family. The value from the scalar logic indicates the data element width applicable for the particular re-arrangement operation, and in some embodiments a further parameter can also be provided specifying a lane size. By such an approach, a re-arrangement instruction can be decoded by the SIMD decode logic in order to cause control signals to be sent to the SIMD pipeline identifying the family of re-arrangement operations to be performed on the received SIMD data, and further means are provided for obtaining a register value from the scalar side to obtain a parameter which specifies which specific member of the family of re-arrangement operations is to be applied according to the data element width.

Whilst the above described techniques may be performed by hardware executing a sequence of native instructions which include the above-mentioned instructions, it will be appreciated that in alternative embodiments, such instructions may be executed in a virtual machine environment, where the instructions are native to the virtual machine, but the virtual machine is implemented by software executing on hardware having a different native instruction set. The virtual machine environment may provide a full virtual machine environment emulating execution of a full instruction set or may be partial, e.g. only some instructions, including the instructions of the present technique, are trapped by the hardware and emulated by the partial virtual machine.

More specifically, the above-described re-arrangement instructions may be executed as native instructions to the full or partial virtual machine, with the virtual machine together with its underlying hardware platform operating in combination to provide the SIMD processing logic and scalar processing logic described above.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
   a register data store having a plurality of registers for storing data;
   processing logic circuitry configured to perform a sequence of operations on data including at least one re-arrangement operation, the processing logic circuitry comprising scalar processing logic circuitry configured to perform scalar operations and SIMD (single instruction multiple data) processing logic circuitry configured to performer SIMD operations;
   the SIMD processing logic circuitry is configured to be responsive to a re-arrangement instruction specifying a family of re-arrangement operations to perform a selected re-arrangement operation from that family on a plurality of data elements constituted by data in one or more of said registers identified by the re-arrangement instruction, the selected re-arrangement operation being dependent on at least one parameter provided by the scalar processing logic circuitry, the at least one parameter identifying a data element width for the data elements on which the selected re-arrangement operation is performed.

2. A data processing apparatus as claimed in claim 1, wherein the data element width is a multiple of a default data element width.

3. A data processing apparatus as claimed in claim 2, wherein the default data element width is defined by the re-arrangement instruction.

4. A data processing apparatus as claimed in claim 1, wherein the SIMD processing logic circuitry is configured to perform the selected re-arrangement operation in each of a number of lanes of parallel processing defined within said one or more registers identified by the re-arrangement instruction, and said at least one parameter provided by the scalar processing logic circuitry further identifies a lane size.

5. A data processing apparatus as claimed in claim 4, wherein the lane size is a multiple of a default data element width.

6. A data processing apparatus as claimed in claim 1, wherein said re-arrangement instruction is an interleave instruction specifying a family of interleave operations.

7. A data processing apparatus as claimed in claim 1, wherein said re-arrangement instruction is a de-interleave instruction specifying a family of de-interleave operations.

8. A data processing apparatus as claimed in claim 1, wherein said re-arrangement instruction is a transpose instruction specifying a family of transpose operations.

9. A data processing apparatus as claimed in claim 1, wherein said re-arrangement instruction is a duplicate instruction specifying a family of duplication operations.

10. A data processing apparatus as claimed in claim 1, wherein said re-arrangement instruction is a reverse instruction specifying a family of reverse operations.

11. A data processing apparatus as claimed claim 1, wherein said re-arrangement instruction is provided within a loop, and the scalar processing logic circuitry is configured to determine the value of said at least one parameter to be used for each iteration of the loop.

12. A data processing apparatus as claimed in claim 11, wherein the scalar processing logic circuitry and SIMD processing logic circuitry are synchronized, and the scalar processing logic circuitry is configured to operates in parallel with the SIMD processing logic circuitry to provide for each iteration the value of said at least one parameter appropriate for that iteration.

13. A data processing apparatus as claimed in claim 11, wherein the value of said at least one parameter to be used for each iteration of the loop is derived from a loop count value maintained by the scalar processing logic circuitry.

14. A data processing apparatus as claimed in claim 11, wherein said re-arrangement instruction is a de-interleave instruction specifying a family of de-interleave operations, wherein the loop is used to perform at least a part of a fast fourier transform (FFT) process and comprises said de-interleave instruction and one or more data processing instructions, the loop being repeated multiple times to perform said at least a part of an FFT process on a plurality of data elements.

15. A data processing apparatus as claimed in claim 14, wherein the number of times the loop is repeated is dependent on the number of data elements of a default data element width on which the at least a part of an FFT process is performed.

16. A data processing apparatus as claimed in claim 11, wherein said re-arrangement instruction is a transpose instruction specifying a family of transpose operations, wherein the loop is used to perform at least a part of a matrix transposition process, the loop being repeated multiple times to perform said at least a part of a matrix transposition process on a plurality of data elements.

17. A data processing apparatus as claimed in claim 1, wherein said re-arrangement instruction is provided within a subroutine, such that the same subroutine can be used to perform any of the family of re-arrangement operations dependent on at least one parameter provided by the scalar processing logic circuitry.

18. A data processing apparatus as claimed in claim 1, wherein said at least one parameter provided by the scalar processing logic is stored by the scalar processing logic circuitry in one of said registers for access by the SIMD processing logic circuitry.

19. A data processing apparatus as claimed in claim 1, wherein if the parameter provided by the scalar processing logic circuitry to define the data element width is greater than or equal to the size of each of the one or more registers identified by the re-arrangement instruction, no re-arrangement operation is performed by the SIMD processing logic circuitry.

20. A data processing apparatus as claimed in claim 1, wherein the register data store comprises a plurality of scalar registers for storing data for access by the scalar processing logic circuitry and a plurality of SIMD registers for storing data for access by the SIMD processing logic circuitry, the at least one parameter being routed from one of said scalar registers to the SIMD processing logic circuitry to cause a specific re-arrangement operation to be selected from said family of re-arrangement operations specified by the re-arrangement instruction.

21. A method of performing re-arrangement operations within a data processing apparatus having a plurality of registers for storing data and processing logic for performing a sequence of operations on data including at least one re-arrangement operation, the processing logic comprising scalar processing logic circuitry for performing scalar operations and SIMD (single instruction multiple data) processing logic circuitry for performing SIMD operations, the method comprising the steps of:

in response to a re-arrangement instruction specifying a family of re-arrangement operations, causing the SIMD processing logic circuitry to perform a selected re-arrangement operation from that family on a plurality of data elements constituted by data in one or more registers identified by the re-arrangement instruction; and providing from the scalar processing logic circuitry at least one parameter, the selected re-arrangement operation being dependent on said at least one parameter and said at least one parameter identifying a data element width for the data elements on which the selected re-arrangement operation is performed.

22. A computer program product comprising a non-transitory computer readable storage medium storing a computer program which, when executed on a data processing apparatus, causes the data processing apparatus to operate in accordance with the method of claim 21, the computer program comprising at least one re-arrangement instruction.

* * * * *